United States Patent [19]

Wallaart

[11] Patent Number: 4,643,298
[45] Date of Patent: Feb. 17, 1987

[54] MAGNETIC BEND SEGMENT FOR A CHAIN CONVEYOR

[75] Inventor: Jacobus J. Wallaart, 's-Gravenzande, Netherlands

[73] Assignee: 501 M.C.C. Nederland B.V., 's-Gravenzande, Netherlands

[21] Appl. No.: 714,232

[22] Filed: Mar. 21, 1985

[30] Foreign Application Priority Data

Mar. 22, 1984 [DE] Fed. Rep. of Germany ... 8408857[U]

[51] Int. Cl.⁴ .......................................... B65G 23/18
[52] U.S. Cl. .................................. 198/805; 198/690.1
[58] Field of Search .............................. 198/690.1, 805

[56] References Cited

U.S. PATENT DOCUMENTS 4,236,632 12/1980 Spodig ............................ 198/690.1

FOREIGN PATENT DOCUMENTS 2444629 8/1980 France ................................. 198/805
2037690 7/1980 United Kingdom ................ 198/805

*Primary Examiner*—Leslie J. Paperner
*Assistant Examiner*—Lyle Kimms
*Attorney, Agent, or Firm*—Morgan & Finnegan

[57] ABSTRACT

A bend segment for a chain conveyor, including a chain movable over a track including one or more bends. The chain is composed of interconnected links of magnetizable material having a substantially rectangular load bearing surface. The bend segment is an integral element, U-shaped in cross-section, with an under surface formed with elongate pockets, extending into the legs of the element and extending in the longitudinal direction of the bend segment. The pockets are arranged to receive magnets provided to keep the chain flat in a bend of the track.

5 Claims, 4 Drawing Figures

MAGNETIC BEND SEGMENT FOR A CHAIN CONVEYOR

This invention relates to a bend segment for a chain conveyor. A prior chain conveyor of this type is described in British Pat. No. 2,037,690, and includes a chain movable over a track including one or more bends, said chain being composed of links of magnetizable material having a substantially rectangular load bearing surface, the successive links in the chain being pivoted together, and magnets being provided in the bend segments. The magnets are provided in the bend segments to prevent the chain from moving upwards in the outer bend portion, which naturally is undesirable when transporting articles with the chain.

The prior chain conveyor has proved to be very satisfactory in practice, and it has been found, for one thing, that wear and tear of the chain links is considerably less than in chain conveyors in which the chain is kept in flat condition in the bends by mechanical means. Also, the chain can be more readily lifted off the track in the bends for cleaning purposes.

A disadvantage of the bend segments of the prior chain conveyor is, however, that these are relatively expensive as they require the use of accurately dimensioned magnets to realize sufficient attraction of the chain links and a metallic closure plate to bundle the lines of force of the magnets. Also, assembly and disassembly of the prior bend segments is troublesome, as the magnets tend to cling to the closure plate.

It is an object of the present invention to provide a bend segment for a chain conveyor of the above kind, which does not have the disadvantages referred to.

The invention accordingly provides a bend segment for a chain conveyor, including a chain movable over a track including one or more bends, said chain being composed of links of magnetizable material having a substantially rectangular load bearing surface, the successive links in the chain being pivoted together, and magnets being provided in the bend segments, characterized in that the bend segment is an integral element, U-shaped in cross-section, the under surface of the U-shaped element being formed with elongate pockets, extending into the legs of the element and extending in the longitudinal direction of the bend segment, said pockets being arranged to receive the magnets, the under surface of the element being further provided with means for confining the magnets is said pockets.

In a preferred embodiment of the invention, the means for confining the magnets comprise slots extending on the outside of the under surface of the U-shaped element throughout the length of the bend segment, the pockets extending from the bottom of the slots into the legs, the sidewalls of said slots sloping upwards from the bottom, each slot being adapted to releasably receive a flat, flexible closure strip whose side edges also slope in the upward direction, the arrangement being such that the strip is a sliding fit in the slot.

As, according to this invention, a metallic closure plate is not used, assembly and disassembly has become simpler. The magnets are placed in the pockets, the flexible closure strips are inserted in the two slots at the underside of the bend segment, and the bend segment is ready.

As the magnets no longer tend to move to the underside of the bend segment, where, in the prior construction, the metallic closure plate is provided, the use of less expensive, sintered magnets is possible, too. It is true that the dimensions of these magnets have a coarser tolerance than the more expensive, ground magnets used in the prior art, but this is not a drawback in the bend segments of the present invention. In fact, a piece of compressible filling material can be placed between the closure strip and the underside of each magnet to ensure that the top of each magnet is pressed as much as possible to the top of the bend segment, so that the force of attraction on the chain links is maximal.

The U-shaped bend segment can be made of a suitable synthetic plastics material, but also, for example, may be cast from aluminium which to prevent oxidation is provided with a wear-resistant coating all around.

The pockets in the legs of the U-shaped bend segment are preferably rounded at the two ends as viewed in the longitudinal direction, with the magnets to be placed in the pockets being rounded as well. This makes for a smooth transition of the chain links from the force field of one magnet to that of the next magnet, which promotes smooth running of the chain.

One embodiment of the invention will now be described, by way of example, with reference to the accompanying drawings, in which FIG. 1 shows a top plan view of a bend segment according to the present invention;

Figure 1:
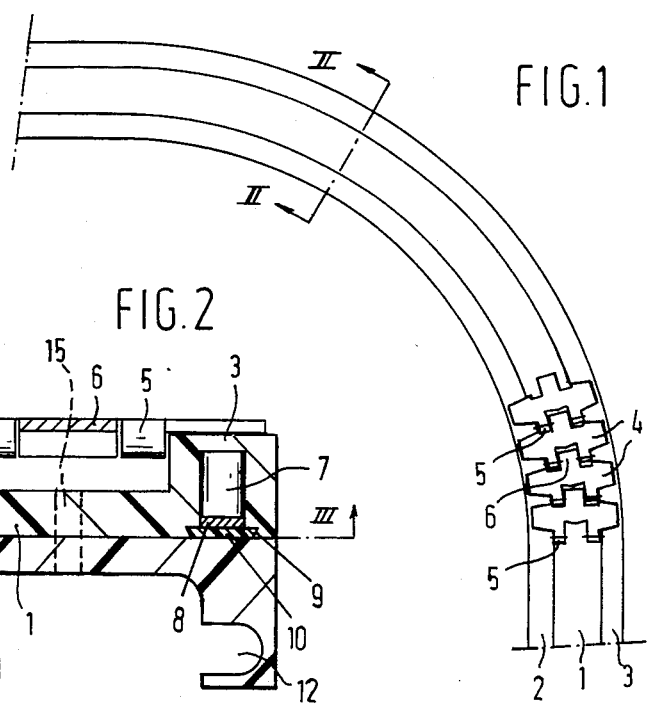
Figure 2:
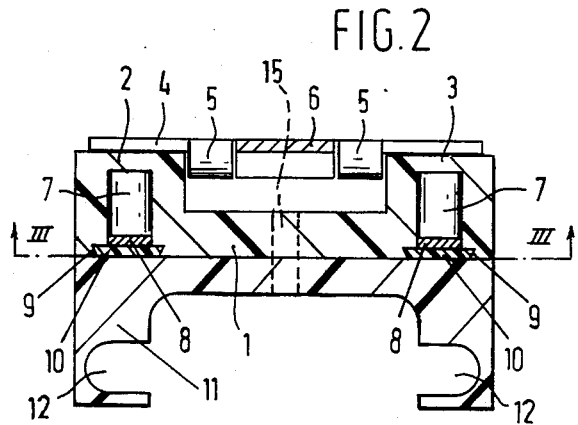
FIG. 2 is a cross-sectional view, taken on the lines II—II of FIG. 1, and shown on a larger scale.

A bend segment according to this invention for a chain conveyor is formed in one piece and U-shaped in cross-section with a base portion 1, and two upright legs 2 and 3, the tops of which form the rails for the conveyor chain. This chain is composed of links 4 with spaced hinge loops 5 on one end and a central hinge loop 6 on the other. Hinge loops 5 and 6 are interconnected by means of hinge pins not shown.

Figure 3:
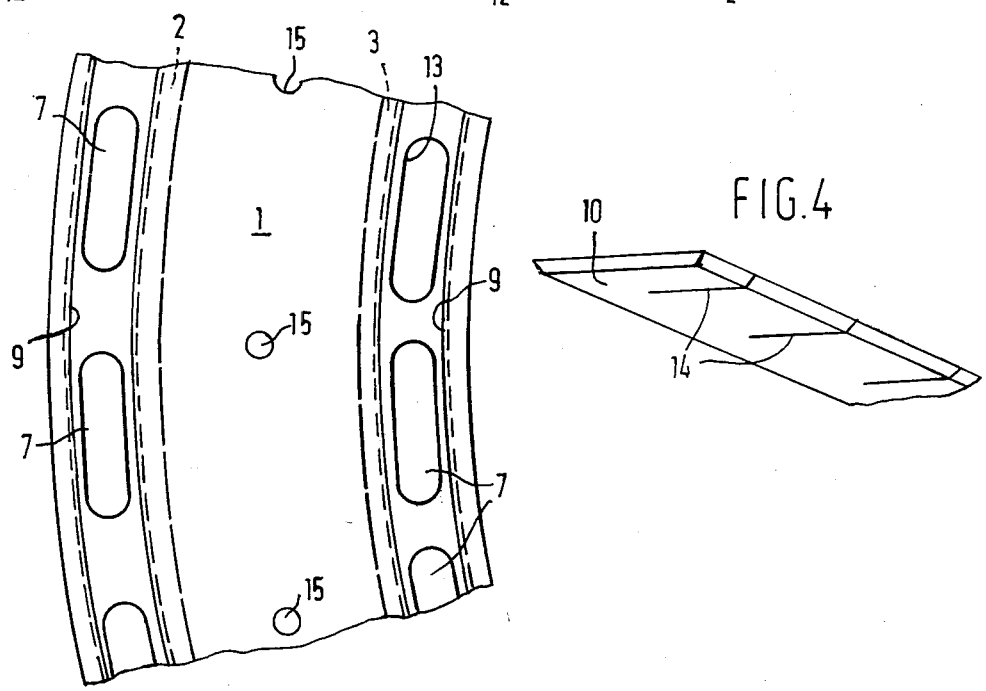
FIG. 3 is a bottom view, taken on the lines III—III of FIG. 2, also on a larger scale, and omitting the closure strip and the magnets.

Formed at the underside of legs 2 and 3 are pockets, shown at 13 in FIG. 3. Placed in these pockets 13 are permanent magnets 7. Preferably, both the pockets 13 and the magnets 7 have rounded ends. This promotes smooth running of the chain, and also is a good compromise between sufficient rigidity of the bend segment, on the one hand, and as large an amount of magnet material for optimum attraction on the chain, on the other.

Formed at the underside of both legs 2 and 3 of the bend segment are undercuts or slots 9, the sidwalls of which slope upwardly from the bottom of the bend segment. To close the pockets 13 with the magnets 7 therein, to prevent the magnets from falling out of the pockets, there is provided a flexible closure strip 10, which is trapezoidal in cross-section. The sidewalls of the closure strip cooperate with those of slot 9 and ensure that the magnets are confined in pockets 13 in a simple manner.

Figure 4:
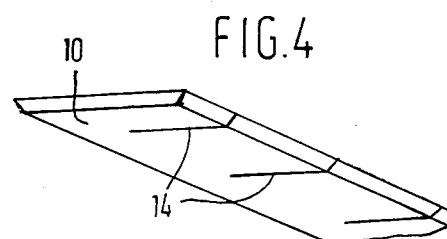
FIG. 4 shows a perspective view of the closure strip.

In order to make it possible to use a straight closure strip 10 in a bend segment, which is most advantageous from the point of view of manufacture, the strip is provided, as shown in FIG. 4, with cross-notches 14 at spaced intervals, which make it possible for the straight strip to follow the bent slot 9 in the bend segment.

In order to make it possible to use inexpensive, sintered magnets, which may be of variable dimensions, there is provided an amount of compressible material 8, such as compressible plastics or rubber, between the closure strip 10 and each magnet 7 to ensure that the magnets in the pockets 13 are pushed upwards in the bend segment to enable them to exert a maximum force of attraction on the chain links.

For the return of the conveyor chain, a likewise integral, U-shaped segment 11 for the return run may be provided under the bend segment. Formed in the legs of this segment are slots 12 for guiding the side edges of the return run of the chain. The bend segment with the magnets and the bend segment 11 for the return chain can be secured together by means, for example, of bolts passed through holes 15.

For certain applications it is desirable that the distance between the forward run of the chain and the return run of the chain may be varied. This is quite easy with the bend segment of the present invention, and just requires loosening the bolts passed through bolts 15 and a new return bend 11 can be attached to the bend segment with the magnets. By virtue of the closure strips there is no danger of the magnets falling out of their pockets 13.

Naturally, the bend segment of the present invention can be used together with a different type of return segment from the bend segment 11 as shown. It will also be clear that various variants are possible without departing from the scope of this invention.

What I claim is:

1. A bend segment for a chain conveyor, including a chain movable over a track including one or more bends, said chain being composed of links of magnetizable material having a substantially rectangular load bearing surface, the successive links in the chain being pivoted together; said bend segment comprising
   (a) an integral element, U-shaped in cross-section and being made of synthetic plastics material, the upper surface of the legs of the U-shaped element being able to support the chain links;
   (b) a plurality of elongate permanent magnets with rounded ends, as viewed in the longitudinal direction, disposed along the length of the bend segment to generate a magnetic field for keeping the chain links flat on the upper surface of the legs of the U-shaped element;
   (c) a plurality of elongate pockets with rounded ends, as viewed in the longitudinal direction, which are formed in the under surface of the U-shaped element, said pockets extending into the legs of the element and extending in the longitudinal direction of the bend segment, said pockets being arranged to receive the magnets;
   (d) flexible closure strips for confining the magnets in said pockets, said closure strips cooperating with means at the under surface of the element for keeping the strips in place at said under surface.

2. A bend segment as claimed in claim 1, wherein the means for keeping the flexible closure strips in place at the under surface of the U-shaped element comprises slots extending on the outside of the under surface of said U-shaped element throughout the length of the bend segment, the pockets extending from the bottom of the slots into the legs, the sidewalls of said slots sloping upwards from the bottom, each slot being adapted to releasably receive a flat, flexible closure strip whose side edges also slope in the upwards direction, the arrangement being such that the strip is a sliding fit in the slot.

3. A bend segment as claimed in claim 2 wherein the closure strip is provided with spaced cross-notches.

4. A bend segment as claimed in any of claims 1 or 2 or 3, wherein a compressible material is provided between each of the magnets in the pockets and the closure strip.

5. A bend segment as claimed in claim 1 or 2, characterized in that the bend segment is connected to a likewise U-shaped bend segment for the return of the chain, the legs of the bend segment for the return run being provided with slots for receiving the side edges of the chain links.

* * * * *